United States Patent
Ishiguro

(10) Patent No.: US 8,696,333 B2
(45) Date of Patent: Apr. 15, 2014

(54) ELECTRIC PUMP

(75) Inventor: Motohisa Ishiguro, Anjo (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 63 days.

(21) Appl. No.: 13/170,312

(22) Filed: Jun. 28, 2011

(65) Prior Publication Data

US 2012/0014819 A1 Jan. 19, 2012

(30) Foreign Application Priority Data

Jul. 14, 2010 (JP) ................................ 2010-159959

(51) Int. Cl.
*F04B 35/04* (2006.01)
*H02K 5/10* (2006.01)
*F04D 13/06* (2006.01)
*H02K 5/128* (2006.01)

(52) U.S. Cl.
CPC ............ *F04D 13/06* (2013.01); *F04D 13/0626* (2013.01); *H02K 5/128* (2013.01)
USPC ....................... 417/423.7; 417/423.11; 310/87

(58) Field of Classification Search
USPC .................. 417/423.7, 423.3, 423.11; 310/87
See application file for complete search history.

(56) References Cited

U.S. PATENT DOCUMENTS

| 2,654,848 | A | * | 10/1953 | Schaefer | 310/86 |
| 2,698,911 | A | * | 1/1955 | Schaefer | 310/86 |
| 6,857,332 | B2 | * | 2/2005 | Pfister | 74/89.34 |
| 6,885,128 | B2 | * | 4/2005 | Matsushita et al. | 310/257 |
| 2005/0196306 | A1 | * | 9/2005 | Del Zanno | 417/423.15 |

FOREIGN PATENT DOCUMENTS

| JP | 9-317682 A | 12/1997 |
| JP | 2005-315184 | 11/2005 |
| JP | 2009-52484 A | 3/2009 |
| JP | 2009-264240 A | 11/2009 |

* cited by examiner

*Primary Examiner* — Bryan Lettman
(74) *Attorney, Agent, or Firm* — Buchanan Ingersoll & Rooney

(57) ABSTRACT

An electric pump which includes a rotor rotationally supported by a housing at a rotation shaft, a stator positioned at an outer side in radial direction of the rotor and fixed to the housing, a pump portion for taking in and discharging fluid in response to a rotation of the rotor, and a can positioned in between the rotor and the stator for preventing the fluid in the pump portion from flowing into the stator. The can possesses conductivity. The stator is grounded via the can.

4 Claims, 4 Drawing Sheets

ELECTRIC PUMP

CROSS REFERENCE TO RELATED APPLICATIONS

This application is based on and claims priority under 35 U.S.C. §119 to Japanese Patent Application 2010-159959, filed on Jul. 14, 2010, the entire content of which is incorporated herein by references.

TECHNICAL FIELD

This disclosure generally relates to an electric pump.

BACKGROUND DISCUSSION

A known electric pump is disclosed as a fluid pump in JPH9-317682A (hereinafter referred to as Patent reference 1). In this fluid pump, slot openings of a stator core are formed on an outer periphery portion of the stator core. The known electric pump includes a can, which prevents fluid in a pump portion from flowing into a stator. Because the slot openings are not formed on an inner periphery portion of the stator core, the stator core receives a high fluid pressure applied to the can within a whole inner periphery of the stator, thus preventing deformation of the can at a vicinity of the slot openings of the stator core.

According to the Patent reference 1, a motor housing for the fluid pump is made of resin, therefore, the motor housing does not appropriately shield the electrical noises generated at coils thereby adversely affecting a pump control circuit and nearby electronic components. The Patent document 1 does not disclose a structure for reducing such electrical noises.

A known fuel supply device excluding electrical noises from a fuel pump portion is disclosed in JP2009-52484A (hereinafter referred to as Patent reference 2). According to the Patent reference 2, the electrical noises are excluded by housing the fuel pump portion with a reservoir provided with a shielding member. The known fuel supply device disclosed in the Patent reference 2 discloses that the electrical noises generated by the fuel pump are shielded and the electrical noises adversely affecting other components are suppressed.

The electric pump that includes the can for preventing pumped fluid from flowing into the stator increases components required compared to common electric pumps. Considering cost and weight, minimizing the components increase is desirable.

Therefore, as described in the Patent reference 2 for the fuel supply device, providing additional component such as the shielding member to the electric pump that includes the can is least desirable as a method for reducing the electrical noises. However, by providing the shielding member at an outer periphery of the reservoir according to the Patent reference 2, the size of the fuel supply device is increased.

A need thus exists for an electric pump, which is not susceptible to the drawback mentioned above.

SUMMARY

In light of the foregoing, the disclosure provides an electric pump which includes a rotor rotationally supported by a housing at a rotation shaft, a stator positioned at an outer side in radial direction of the rotor and fixed to the housing, a pump portion for taking in and discharging fluid in response to a rotation of the rotor, and a can positioned in between the rotor and the stator for preventing the fluid in the pump portion from flowing into the stator. The can possesses conductivity. The stator is grounded via the can.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Embodiments of an electric pump will be explained with reference to illustrations of FIGS. 1 to 4.

Figure 1:
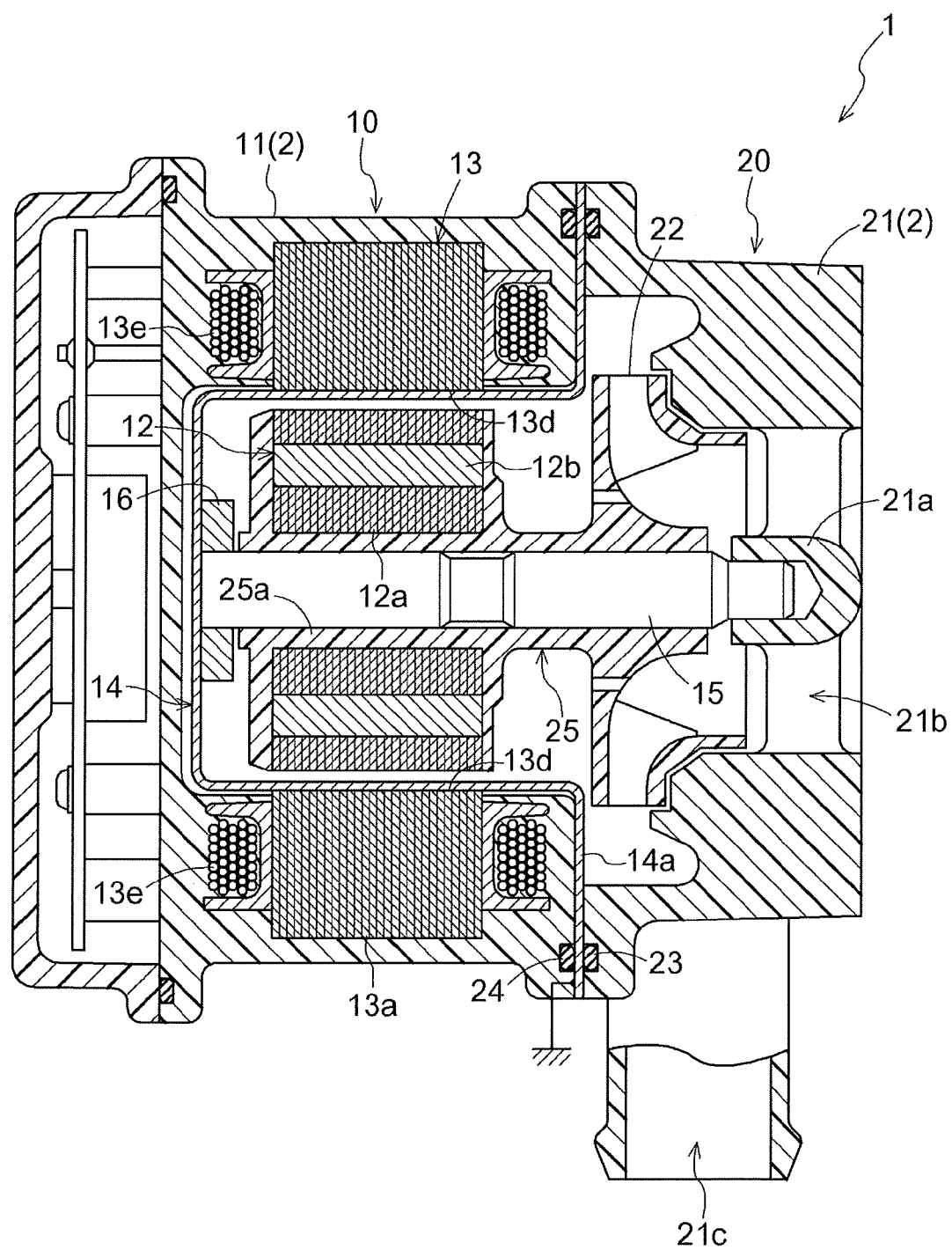
FIG. 1 is a cross-sectional view of an electric pump according to a first embodiment disclosed here.

A first embodiment will be explained referring to FIGS. 1 to 3. As shown in FIG. 1, an electric pump 1 includes a motor portion 10 in which a rotor 12 rotates by supplying power to coil portions 13e of a stator 13, and a pump portion 20 for taking in and discharging fluid in which an impeller 22 rotates in response to the rotation of the rotor 12. The motor portion 10 and the pump portion 20 are housed inside a housing 2 made of resin including a motor housing 11 and a pump housing 21.

The motor portion 10 includes the motor housing 11, the rotor 12, the stator 13, a can 14 and a rotation shaft 15. As illustrated in FIG. 2, the motor housing 11 includes the stator 13 being cast coated by resin, and a cylindrical space 11a formed to accommodate the can 14 therein.

The rotor 12 includes a rotor core 12a formed by stacked layers of thin electromagnetic steel sheets, and permanent magnets 12b. The permanent magnets 12b are each placed in multiple slots penetrating through the rotor core 12a. The rotor 12 is positioned inside of the stator 13, which is fixed to the motor housing 11, in a radial direction in opposition to the stator 13.

The rotor 12 and the impeller 22 are resin molded and integrally form a rotating body 25. The rotation shaft 15 is fitted into a through-hole penetrating a center of the rotating body 25. Ends of the rotation shaft 15 are supported by a rotation shaft fixation member 16 fixed to the can 14 and a rotation shaft fixation portion 21a formed at a pump housing 21. When fluid flows between a bearing portion 25a of the rotating body 25 and the rotation shaft 15, the bearing portion 25a serves as fluid bearing, and the rotating body 25 rotates smoothly around the fixed rotation shaft 15. The rotation shaft 15 may be formed to rotate integrally with the rotating body 25.

The stator 13 and the rotor 12 both include a stator core 13a formed by stacked layers of thin electromagnetic steel sheets. As illustrated in FIG. 3, an electromagnetic steel sheet that forms the stator core 13a includes an annular yoke portion 13b and tooth portions 13c projecting inwardly in a radial direction from an inner periphery of the yoke portion 13b. According to the embodiment, for example, six tooth portions 13c are positioned equally spaced in a circumferential direction, and on each of three end portions of every other tooth portions 13c, a projection 13d is formed to project inwardly toward the radial direction for enhancing electrical conduction. On the tooth portions 13c, coils are wound to form the coil portions 13e. When supplying power to the coil portions 13e, the rotor 12 starts rotating driven by electromagnetic action with the stator 13.

Figure 2:
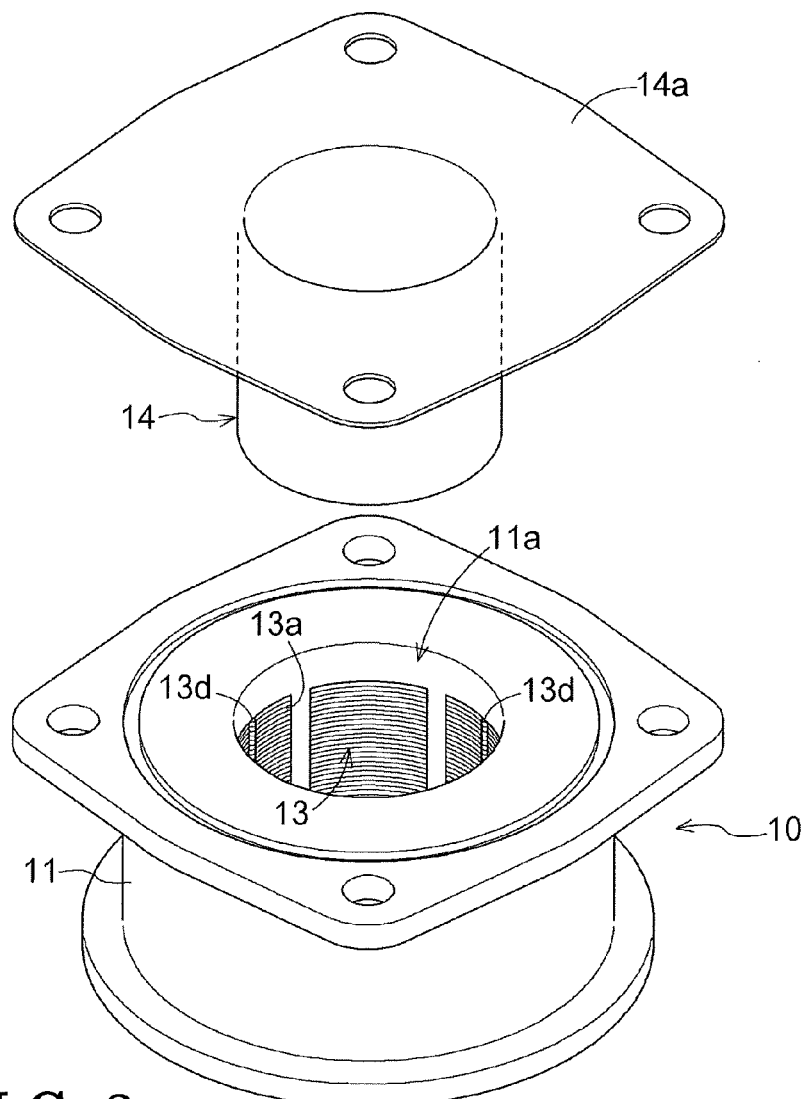
FIG. 2 is an exploded perspective view of the electric pump.
Figure 3:
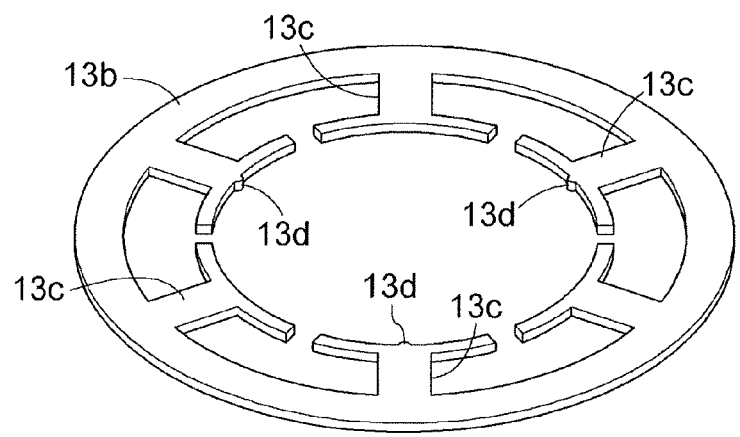
FIG. 3 is a perspective view of an electromagnetic steel sheet which forms a stator core.

While the stator 13 is being cast coated by resin and thereby fixed to the motor housing 11, each end portions of the tooth portions 13c of the stator 13 are exposed to an inner periphery of the motor housing 11 (refer to FIG. 2 and FIG. 3). That is, the projections 13d formed on the end portions of the tooth portions 13c are projecting toward the cylindrical space 11a of the motor housing 11.

As shown in FIG. 2, when the can 14, which is cup shaped and has the same external diameter as an inner diameter of the cylindrical space 11a of the motor housing 11, is inserted to the cylindrical space 11a, the projections 13d press fit the can 14 so as to stably hold the stator 13. Inside the can 14, the rotor 12 of the rotating body 25 is housed.

The can 14 is fixed to the motor housing 11 at a flange 14a of the can 14 being fastened by bolts or means alike. When fastening, the flange 14a is fixed in between sealing members 23 and 24 to prevent pumped fluid in the pump portion 20 from flowing into the stator 13. The pump housing 21, the can 14, and the motor housing 11 may be jointly fastened, or the motor housing 11 and the pump housing 21 may be secured by using an adhesive or other method.

The pump portion 20 includes the pump housing 21 and the impeller 22. The housing 2 includes the motor housing 11 and the pump housing 21. The rotation shaft 15 and the rotating body 25 are housed in an internal space of the housing 2. The impeller 22 of the rotating body 25 is housed within the pump housing 21, and when the impeller 22 rotates, fluid is sucked in from an intake port 21b formed on the pump housing 21 and discharged from a discharge port 21c.

According to the electric pump 1 disclosed here, the can 14 is made from an electrically conductive material and the can 14 is being connected to ground. An example of grounding method is to fasten a copper wire to the can 14 and connect the extended copper wire to the ground outside of the electric pump 1. An example of suitable electrically conductive material for the can 14 is stainless steel sheet because stainless steel sheet is a non-magnetic material and has no electromagnetic influence on the rotor 12 and the stator 13.

According to a configuration of the electric pump 1 explained above, when the coil portions 13e are supplied with power, the rotor 12 starts rotating and the impeller 22 rotates accordingly and fluid is sucked in from the intake port 21b and discharged from the discharge port 21c. In the circumstances of taking in and discharging fluid, the fluid flows into the pump housing 21 and to the internal space of the can 14, however, the can 14 prevents the fluid from flowing into the stator 13 thereby preventing problems, for example, of an electrical leakage.

When energizing the coil portions 13e of the stator 13, electrical noises are generated, however, the electric pump 1 disclosed here releases the electrical noises generated at the stator 13 to the ground through the projections 13d and the can 14, resulting in reducing the electrical noises. Because reduction of the electrical noises is achieved by grounding the stator 13 through the can 14 that is electrically conductive, an additional member to shield the electrical noises is unnecessary, thus avoiding increases in manufacturing cost, weight, and device size.

The projections 13d, serving as electrical connections for enhancing conductivity, are formed to retain the can 14 and the stator 13 in a stable contact state, and to prevent the can 14 from shifting the position relative to the stator 13. Retaining the can 14 and the stator 13 at the projections 13d in the stable contact state prevents a degradation of electrical noises reduction effect caused by an unstable contact state between the can 14 and the stator 13, and also prevents the can 14 from shifting to a slant state which interfere with the rotation movement of the rotor 12. In other words, because the can 14 and the stator 13 are firmly in contact with each other, the degradation of electrical noises reduction effect caused by the unstable contact state between the can 14 and the stator 13, and shifting of the can 14 to a slant state interfering with the rotation movement of the rotor 12 are prevented. Additionally, the stability of the contact state between the can 14 and the stator 13 prevents an abnormal noise from being generated when the can 14 and the stator 13 switch the states between a contact and a non-contact, and also prevents accumulation of heat generated at the coil portions 13e by releasing the heat through the stator 13 and the can 14.

Figure 5:
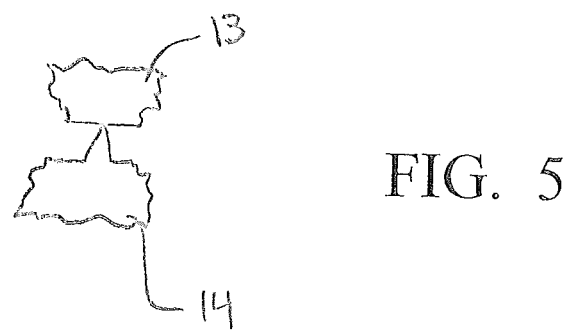
FIG. 5 illustrates a projection formed on the can.

In this embodiment, the projections 13d are formed to project inwardly toward the radial direction on each end portions of every other tooth portions 13c, that is there are three projections when there are six teeth. However, the number of the projections 13d and a shape of the projections 13d are not limited to what is shown in FIG. 3. For example, to increase a degree of press fit force of the can 14, the projection 13d may be formed on all six of the tooth portions 13c. In an opposite manner, to decrease a degree of press fit force of the can 14, the number of the projection 13d or the projection amount of the projection 13d may be reduced, or a formation of the projections 13d may be limited to a selected layer of stacked electromagnetic steel sheets. In addition, the projections 13d may be formed on the can 14 instead of on the stator 13 (see FIG. 5). In any embodiment, placing the projections 13d evenly in the circumferential direction provides evenly distributed press fit pressure for preventing slanting of the can 14.

Figure 4:
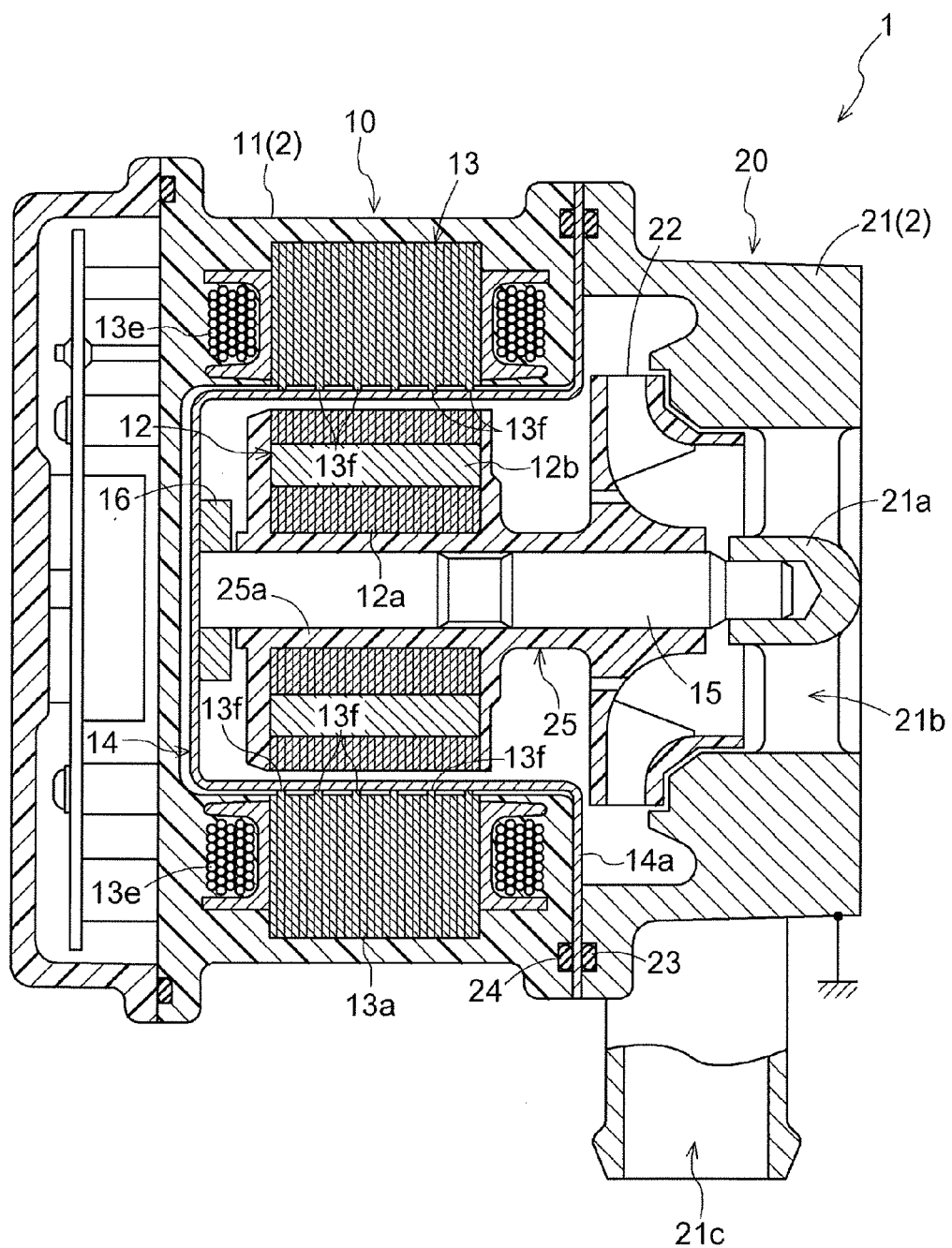
FIG. 4 is a cross-sectional view of the electric pump according to a second embodiment disclosed here.

FIG. 4 shows a second embodiment of the electric pump 1. Only the differences of the previous embodiment of the electric pump 1 are described below and explanations for the common configuration will not be repeated.

According to the second embodiment, the projections 13d are not formed on the electromagnetic steel sheets which form the stator core 13a. Instead, to enhance conductivity between the can 14 and the stator 13, projected tooth portions 13f (i.e., serving as the electrical connections for enhancing conductivity) are structured on multiple numbers of the electromagnetic steel sheets which form the stator core 13a (six in the example). A projected tooth portion 13f is formed by projecting a whole tooth portion 13c of an electromagnetic steel sheet which forms the stator core 13a more inwardly toward the radial direction than the tooth portion 13c of another electromagnetic steel sheet which forms the stator core 13a. The degree of press fit force is adjusted by changing the interval of electromagnetic steel sheets possessing the projected tooth portions 13f.

Further, according to the second embodiment, the pump housing 21 that is in contact with the flange 14a of the can 14 is grounded by producing the pump housing 21 with an electrically conductive material. In this configuration, grounding may be achieved through other member instead of directly through the can 14.

According to a third embodiment, instead of providing the projections 13d or in addition to providing the projections 13d for enhancing electrical conduction, the stator 13 and the can 14 are retained together, for example, by using an electrically conductive adhesive. Spreading the electrically conductive adhesive in between the inner periphery of the motor housing 11 and the outer periphery of the can 14 is an example of a method for retaining the can 14 and the stator 13.

The electrically connected state is easily maintained by applying the electrically conductive adhesive between the stator 13 and the can 14. As a result, the electrical noises generated at the coil portions 13e are released to ground through the stator 13, the adhesive, and the can 14, to achieve further reduction of the electrical noises and to prevent an abnormal noise from being generated when the can 14 and the stator 13 switch the states between the contact and the non-contact.

The electric pump in this disclosure may be applied to different type of pumps other than the pump that uses an impeller, for example, to a positive displacement pump.

According to an aspect of this disclosure, the electric pump 1 includes the rotor 12 rotationally supported by the housing 2 at the rotation shaft 15, the stator 13 positioned at an outer side in the radial direction of the rotor 12 and fixed to the housing 2, the pump portion 20 for taking in and discharging the fluid in response to the rotation of the rotor 12, and the can 14 positioned between the rotor 12 and the stator 13 for preventing the fluid in the pump portion 20 from flowing into the stator 13. The can 14 possesses conductivity. The stator 13 is grounded via the can 14.

Grounding the stator 13 via the can 14 that is electrically conductive reduces the electrical noises generated at the coil portions 13e of the stator 13 by releasing the electrical noises to ground via the stator 13 and the can 14. While a known fuel supply device requires additional member to shield the electrical noises, reduction of the electrical noises is achieved only by grounding the stator 13 via the can 14 that is electrically conductive to avoid increase in cost, weight, and device size.

According to another aspect of this disclosure, the projections 13d or the projected tooth portions 13f, the electrical connections for enhancing conductivity, are provided between the inner periphery of the stator 13 and the outer periphery of the can 14.

Providing the projections 13d or the projected tooth portions 13f between the inner periphery of the stator 13 and the outer periphery of the can 14 results in avoiding an increase of the size of the electric pump by providing additional components for enhancing conductivity, and also results in more effectively releasing the electrical noises to ground as well.

According to a further aspect of this disclosure, the projections 13d or the projected tooth portions 13f serving as the electrical connections for enhancing conductivity are provided on the stator 13 or the can 14 for retaining the can 14 to the stator 13 in the stable contact state.

The projections 13d or the projected tooth portions 13f, serving as the electrical connections for enhancing conductivity, also serve to retain the can 14 to the stator 13 in contact state, thereby, preventing a shifting of the position of the can 14 relative to the stator 13. This configuration prevents degradation of electrical noises reduction effect caused by unstable contact state between the can 14 and the stator 13, and also prevents the can 14 from shifting to a slant state and interfering with the rotation movement of the rotor 12. Additionally, stability of the contact state between the can 14 and the stator 13 prevents the can 14 and the stator 13 generating the abnormal noises by switching the states between the contact and the non-contact when contact state is unstable, and also have effect of releasing heat generated at the coil portions 13e through the stator 13 and the can 14.

According to a further aspect of this disclosure, the electrical connection for enhancing conductivity between the can 14 and the stator 13 is an electrically conductive adhesive.

By applying the electrically conductive adhesive to adhere the can 14 and the stator 13, electrically connected state between the can 14 and the stator 13 is achieved easily. As a result, further reduction of the electrical noises and prevention of abnormal noise generation from the can 14 and the stator 13 when switching the states between contact and non-contact are achieved.

According to a further aspect of this disclosure, the can 14 and the housing 2 ground the stator 13.

This configuration enables the grounding by connecting a grounding wire to the housing 2 which is positioned externally in radial direction to the stator 13. This configuration avoids wiring through the electric pump 1 internally thus provides simpler structure for reducing the electrical noises.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. An electric pump, comprising:
a rotor rotationally supported by a housing at a rotation shaft;
a stator positioned at an outer side in a radial direction of the rotor and fixed to the housing;
a pump portion for taking in and discharging fluid in response to a rotation of the rotor;
a can positioned in between the rotor and the stator for preventing the fluid in the pump portion from flowing into the stator, the can possessing a conductivity;
tooth portions formed on the stator and protruding toward the outer periphery of the can; and
projections on a plurality, but not all, of the tooth portions projecting towards and contacting the outer periphery of the can;
wherein the stator is grounded via the can; and
wherein the projections press fit and fix the can to the stator.

2. The electric pump according to claim 1, wherein the can and the housing ground the stator.

3. An electric pump, comprising:
a rotor rotationally supported by a rotation shaft that is supported by a housing;
a stator positioned radially outward of the rotor and fixed to the housing, the stator comprising plural electromagnetic sheets arranged in an axial stack, each of the electromagnetic sheets including a plurality of circumferentially spaced apart tooth portions projecting inwardly toward the rotor;
a pump portion which receives and discharges fluid in response to rotation of the rotor;
a conductive can positioned radially outward of the rotor and radially inward of the stator;
the conductive can possessing an outward surface facing the inwardly projecting tooth portions, the conductive can both preventing the fluid in the pump portion from flowing into the stator and grounding the stator; and
a first plurality of the tooth portions of different electromagnetic sheets extending radially inwardly farther than others of the tooth portions so that the first plurality of tooth portions contact the outward surface of the can so that the conductive can is electrically connected to the stator at the first plurality of tooth portions and so that the conductive can and the stator are retained in a stable contact state while the others of the tooth portions are spaced from the outward surface of the can.

4. The electric pump according to claim 3, wherein the plurality of tooth portions of each electromagnetic sheet project inwardly from a common annular yoke portion.

* * * * *